United States Patent
Strand

(10) Patent No.: US 9,798,733 B1
(45) Date of Patent: Oct. 24, 2017

(54) REDUCING FILE SPACE THROUGH THE DEGRADATION OF FILE CONTENT

(75) Inventor: William Alexander Strand, Issaquah, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 346 days.

(21) Appl. No.: 13/315,081

(22) Filed: Dec. 8, 2011

(51) Int. Cl.
*G06F 17/30* (2006.01)
*G06F 7/00* (2006.01)
*G06F 9/45* (2006.01)

(52) U.S. Cl.
CPC ...... *G06F 17/30153* (2013.01); *G06F 8/4434* (2013.01); *G06F 2212/7204* (2013.01)

(58) Field of Classification Search
None
See application file for complete search history.

(56) References Cited

U.S. PATENT DOCUMENTS

| | | | | |
|---|---|---|---|---|
| 6,980,703 | B2* | 12/2005 | Araki | 382/305 |
| 7,747,574 | B1* | 6/2010 | Svendsen | 707/640 |
| 2003/0044076 | A1* | 3/2003 | Mitchell et al. | 382/239 |
| 2003/0195852 | A1* | 10/2003 | Campbell et al. | 705/51 |
| 2004/0254908 | A1* | 12/2004 | Tada | 707/1 |
| 2006/0164682 | A1* | 7/2006 | Lev | 358/1.15 |
| 2006/0204054 | A1* | 9/2006 | Steinberg | H04N 5/232 382/118 |
| 2007/0165725 | A1* | 7/2007 | Krishnamurthy et al. | 375/240.26 |
| 2007/0285714 | A1* | 12/2007 | Hirayama et al. | 358/1.15 |
| 2008/0263103 | A1* | 10/2008 | McGregor et al. | 707/200 |
| 2009/0157810 | A1* | 6/2009 | Tripathi et al. | 709/204 |
| 2010/0199101 | A1* | 8/2010 | Harris | 713/189 |
| 2011/0178997 | A1* | 7/2011 | Johnson | G06F 17/30091 707/694 |
| 2011/0221965 | A1* | 9/2011 | Mitchell et al. | 348/575 |
| 2012/0269441 | A1* | 10/2012 | Marchesotti et al. | 382/195 |

OTHER PUBLICATIONS

GIMP, "4.4. Compressing Images 4. Common Tasks," May 24, 2011.*

* cited by examiner

*Primary Examiner* — Usmaan Saeed
*Assistant Examiner* — Yu Zhao
(74) *Attorney, Agent, or Firm* — Thomas | Horstmeyer, LLP; Michael J. D'Aurelio; Jason M. Perilla

(57) ABSTRACT

Disclosed are various embodiments for a storage optimizer executable in the at least one computing device for degradation files. The storage optimizer comprises logic that facilitates receiving a file from a user for storage in a memory and logic that generates network content to be presented in at least one user interface for receiving at least one selection for degrading the file. The at least one selection includes a degradation scheme and a degradation schedule. The storage optimizer further comprises logic that implements the at least one selection for degrading the file according to the degradation scheme and the degradation schedule.

20 Claims, 7 Drawing Sheets

REDUCING FILE SPACE THROUGH THE DEGRADATION OF FILE CONTENT

BACKGROUND

Computer users are constantly generating files to store in computer memory. Some of these files may be stored in memory for many years. These files, which may be digital pictures, audio files, video files, documents, etc., may be large in size and may take up a significant portion of allocated computer memory.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to optimizing storage space in computer memory such as a data store. Various embodiments of the present disclosure seek to provide users with a way to plan for and optimize the storage of their files in a computing device. Through the use of file degradation policies, users can reduce the file size for effectively storing files in the long run. A file degradation policy includes, for example, a degradation scheme, a degradation schedule, a condition for implementing the policy, and potentially other aspects. In the following discussion, a general description of the system and its components is provided, followed by a discussion of the operation of the same.

Figure 1:
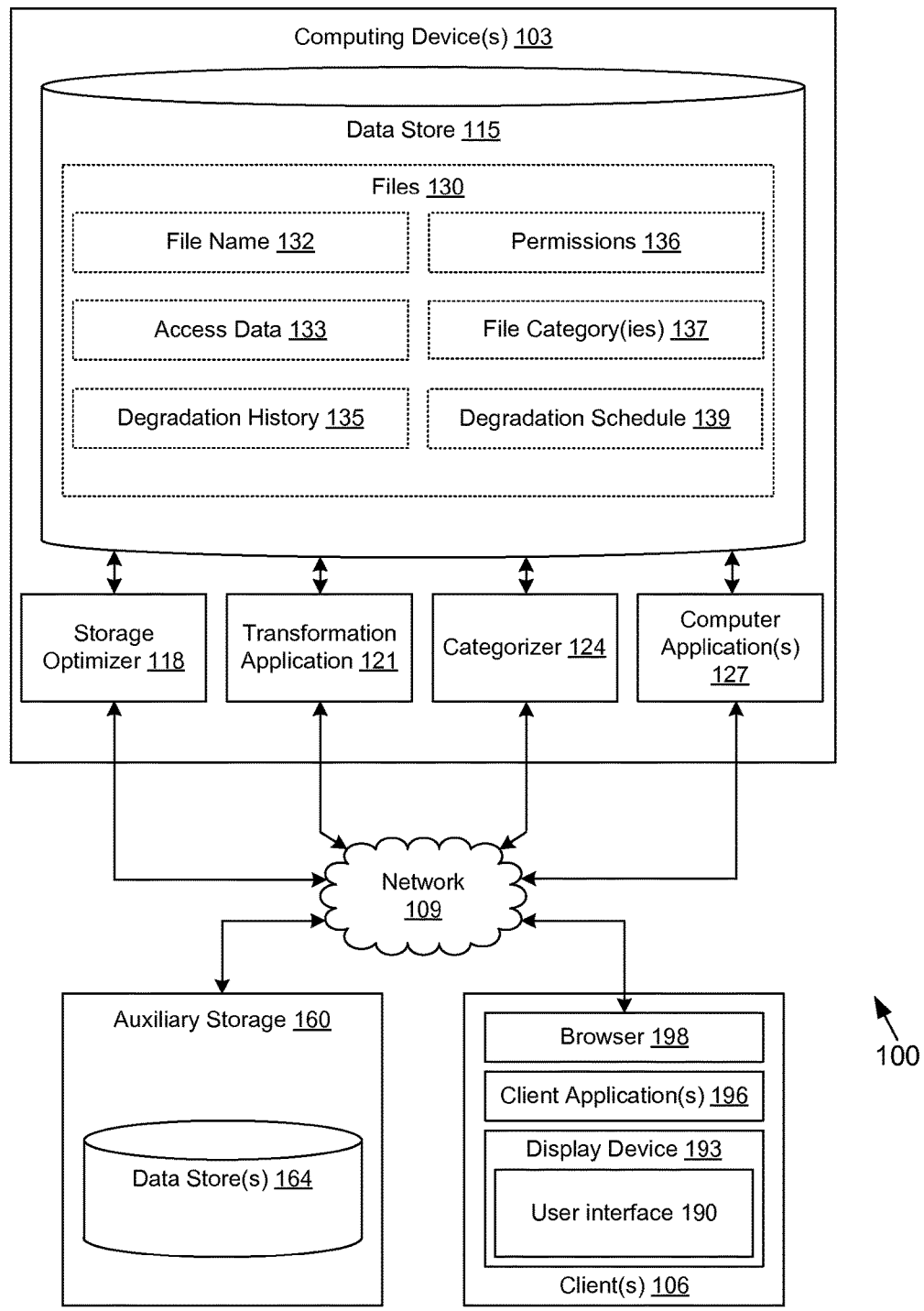
FIG. 1 is a drawing of a networked environment according to various embodiments of the present disclosure.

With reference to FIG. 1, shown is a networked environment 100 according to various embodiments. The networked environment 100 includes one or more computing devices 103 in communication with one or more clients 106 by way of a network 109. Additionally, an auxiliary storage 160 may be connected to the computing devices 103 over the network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device is referred to in the singular, it is understood that a plurality of computing devices 103 may be employed in the various arrangements as described above.

Various applications and/or other functionality may be executed in the computing device 103 according to various embodiments. Also, various data is stored in a data store 115 that is accessible to the computing device 103. The data store 115 may be representative of a plurality of data stores as can be appreciated. The data stored in the data store 115, for example, is associated with the operation of the various applications and/or functional entities described below.

The components executed on the computing device 103, for example, include a storage optimizer 118, a transformation application 121, a categorizer 124, a computer application 127, and other applications, services, processes, systems, engines, or functionality not discussed in detail herein. The storage optimizer 118 is executed to facilitate optimized storage for users. By employing the storage optimizer, users can schedule a variety of degradation schemes to reduce the size of files over time. The transformation application 121 is configured to process one or more files of a user to reduce the bit size of files. The transformation application 121 may employ various file degradation algorithms for lowering file size. For example, the transformation application may employ a bit rate reduction, color saturation, file compression, file conversion, selective deletion, or any other process for transforming a file. The categorizer 124 processes files and places them in various categories using tagging, text string searches, or any other technique for classifying a file. Computer applications 127 access and/or modify the files of a user.

The data stored in the data store 115 includes, for example, files and potentially other data. Files 130 may include a file name 132, file access data 133, degradation history 135, permissions 136, file categories 137, data related to a degradation schedule 139, or any other information or metadata relating to the file. The file name 132 includes information for identifying the file. This allows a user to refer to the file at a later point in time. Access data 133 represents a history of access and modification to the file. When a file is accessed or modified, the access data 133 is updated to reflect usage of the file.

The degradation history 135 of a file tracks when degradation events have taken place. When a transformation of the file occurs, the degradation history 135 of the file is updated. The permissions 136 of a file indicate who owns the file. File permissions 136 also indicate which users can access, modify, or delete a particular file. File categories 137 is metadata that classifies a particular file. Files that follow a particular structure, or that fall within a particular category, may be categorized as one or more file categories 137. A degradation schedule 139 includes one or more references to future points in time when a degradation operation is scheduled to take place.

The client 106 is representative of a plurality of client devices that may be coupled to the network 109. The client 106 may comprise, for example, a processor-based system such as a computer system. Such a computer system may be embodied in the form of a desktop computer, a laptop computer, a personal digital assistant, a cellular telephone, set-top box, music player, web pad, tablet computer system, game console, or other devices with like capabilities. The client 106 may include a display 193. The display comprises, for example, one or more devices such as cathode ray tubes (CRTs), liquid crystal display (LCD) screens, gas plasma-based flat panel displays, LCD projectors, or other display devices, etc.

The client 106 may be configured to execute various applications such as a browser 198, one or more client applications 196, and/or other applications. The browser 198 may be executed in a client 106, for example, to access and render network pages, such as web pages, or other network content served up by the computing device 103 and/or other servers. The client 106 may also be configured to execute client application 196 such as, for example, email applications, instant message applications, and/or other applications. Client applications may also be configured to access and render network content provided by the computing device 103 and/or other servers. Network content may be accessed and rendered using one or more user interfaces 190 to be presented in the display device 193 for the user.

An auxiliary storage 160 may also communicate with a computing device 103 over the network 109. The auxiliary storage 160 may include a data store 164 for storing backup data. Files 130 may be stored redundantly in auxiliary storage 160. The auxiliary storage 160 may be operated by third party service providers that provide data backup services.

Next, a general description of the operation of the various components of the networked environment 100 is provided. To begin, data store 115 is used for storing many files belonging to a user. Users can store different types of files 130 such as audio files, video files, documents, images, or any other type of file. Users send files 130 to the computing device 103 over the network 109 for long term storage. For example, a user may want to save a large digital photo album on computing device 103 for access at some later point in time. However, the data store 115 may be limited by a physical capacity. Specifically, the data store 115 has an intrinsic physical capacity limiting an amount of bytes a user may use for storing one or more files 130. Alternatively, limits may be placed on a particular user in regard to the quantity of memory resources of the data store 115 that is allocated to the user. Also, using storage resources may result in a high cost for the user as some storage servers require users to pay for additional storage. Regardless of the reason for limiting data store usage, a user may be mindful about how many bytes of data to store at one point in time in the data store 115.

The user may employ the functionality of the storage optimizer 118 to assist in efficiently storing files 130 in the data store 115. The storage optimizer 118 allows a user to reduce the size of a file 130 over time. By reducing the size of files, a user has more storage capacity, and in turn, the user may store more files in the data store 115. The storage optimizer 118 employs a degradation scheme and a degradation schedule for degrading a particular file 130. A degradation scheme includes any kind of file transformation that reduces the size of the file 130. One example of a degradation scheme is converting a color digital photograph into a black and white digital photograph. Thus, by changing the color saturation of the image file, the user can lower the file size by implementing a degradation scheme. The user can also specify a degradation schedule for degrading the file 130. Here, the user selects one or more future points in time to apply the degradation scheme. In one embodiment, the degradation schedule is a range of time for applying many transformations to a particular file 130. For example, a user can specify gradually reducing the color saturation of an image over a period of four years starting in two years. That is to say, the user selects a degradation schedule that begins in year two and ends in year six. In another embodiment, the user can specify a single future point in time to apply one transformation. For example, the user can indicate converting an image to black and white in five years.

To apply the degradation scheme, the user employs the functionality of the storage optimizer 118. The storage optimizer generates network content for the user to make the appropriate selections to execute the file degradation. For example, the storage optimizer 118 may generate network content and send it to the client 106 over the network 109. The client 106 may employ a browser 198, a client application 196, or any other dedicated application executable in the client 106 to render the network content for display in the display device 193. Specifically, this facilitates the creation of a user interface 190 in the client 106 to allow a user to interact with the storage optimizer 118. Through the generation of network content for the user, the storage optimizer 118 facilitates one or more selections for a degradation scheme and a degradation schedule by the user.

The user identifies a particular file 130 using the file name 132 of the file 130 and then submits one or more selections to the computing device 103. The storage optimizer 118 receives a specification to implement the appropriate degradation scheme and degradation schedule. In one embodiment, the storage optimizer 118 stores the specified degradation scheme and degradation schedule in the degradation schedule 139 associated with the specified file 130. For example, if the storage optimizer 118 receives a selection for converting "image.JPG" to a black and white image in five years, then the storage optimizer 118 records this instruction in the degradation schedule 139. Accordingly, each file 130 may have a scheduled degradation reflected by its corresponding degradation schedule 139. In an alternate embodiment, a master degradation schedule maintains a list of all planned file degradation operations.

The storage optimizer 118 continuously checks whether it is time to execute the degradation process by continuously consulting the degradation schedule 139. When a degradation operation is scheduled, the storage optimizer 118 instructs the transformation application 121 to execute the appropriate degradation process. The storage optimizer 118 specifies the degradation parameters according to the one or more selections by the user. The transformation application 121 then degrades the file 130. This reduces the size of the file 130 and consequentially increases allocated storage capacity for the user. In one embodiment, the storage optimizer 118 sends an electronic notification to the user that a transformation to a particular file 130 is imminent. This electronic message can be an automated email, an instant message, a Short Message Service text message, or any other electronic message. In another embodiment, the electronic message includes a cancel feature allowing the user to cancel a scheduled degradation.

After the transformation application 121 performs the scheduled degradation operation, the degradation history 135 of the degraded file is updated. The degradation history 135 of a file 130 indicates that the file 130 has been subjected to one or more transformation operations. The transformation operation is configured to perform a bit rate reduction, a color saturation function, a file compression, a file format transformation, a resolution reduction, a selective deletion, or any other transformation that reduces the size of the file 130. The transformation application 121 may be configured to perform a transformation on a selected portion of the file. For example, the transformation application 121 can be instructed by the storage optimizer 118 to delete a cover page only for a specified document. Alternatively, a user can select portions of a document by circling areas with a draw tool such that only the selected are subject to a degradation scheme.

In one embodiment, the user can select a degradation scheme that involves sending the file 130 to an auxiliary storage 160. In this case, rather than scheduling a degradation scheme that uses the transformation application 121, the storage optimizer 118 sends the file 130 to an auxiliary storage 160 according to the specified degradation schedule. Thus, by removing the file 130 from the data store 115 and storing it in an auxiliary data store 164, the user has increased an allocated space of memory in the data store 115. In one example, the auxiliary storage 160 may transform the file 130 into a physical format or some other non-digital format and then send it to the user. For example, if the user specifies a degradation scheme for sending a digital photo file 130 to auxiliary storage 160 after a period of 5 years, the auxiliary storage 160 may be configured to convert the digital photo file 130 into a physical, tangible image printout for the user. In one embodiment, the auxiliary storage 160 is included within the client 106.

In one embodiment, the storage optimizer 118 is configured to receive one or more selections for degrading multiple files 130 such as a music library of mp3 files. In this case, the mp3 files 130 are stored in the data store 115. The storage optimizer 118 creates network content to be presented in a user interface 190 in the client 106. Through the use of the user interface 190, the storage optimizer 118 receives one or more selections from the user regarding degrading the many mp3 files.

The storage optimizer 118 may also be configured to receive an indication of implementing one or more degradation policies. Through the user interface 190, the user may indicate that the user desires to implement a policy for degrading files 130 subsequently stored in data store 115. In this example, policy includes a degradation scheme, a degradation schedule, and a condition for implementing the policy. For instance, a user may wish to implement a policy of reducing the resolution by 50% of all images that have never been accessed more than three times within a five year window. In this example, the degradation scheme of the policy is a resolution reduction transformation. The degradation schedule is a one-time transformation scheduled to take place immediately after the policy condition is triggered. The policy condition is specified as an occurrence of an event, where the event comprises fewer than three accesses within a five year window. The user may indicate the terms of the policy through the user interface 190 such that the storage optimizer 118 receives the terms of the policy for implementing the policy. Next, the storage optimizer 118 implements the policy for any file 130 subsequently received by the computing device 103 and stored in the data store 115. In one embodiment, the user can instruct the storage optimizer 118 to retroactively apply the policy to any file 130 received prior to the implementation of the policy.

One or more computer applications 127 may access and/or modify files 130 stored in the data store 115. Each access updates the access data 133 of the file 130. Thus, when implementing the policy described above, the storage optimizer 118 is configured to consult the access data 133 of each file to check whether there have been three or fewer data accesses over a period of five years. The triggering of this condition will result in an automatic execution of the transformation application 121 to reduce the resolution of any image file that has been accessed fewer than three times in five years. Thus, degradation policies are continuously running and checking whether the specified condition is triggered.

In one embodiment, a condition of a degradation policy may be applied to categories of a file 130. For example, audio files of the mp3 type format may include genre, artist, album, or any other type of metadata stored as a tag. This metadata may be stored as a file category 137. The storage optimizer 118 can implement a degradation policy for degrading all mp3 files that are tagged as "pop" music. In other words, if an mp3 file has a file category 137 of "pop," the policy condition is triggered and the file is then subjected to the degradation process. Thus, each "pop" mp3 file will be subjected to the degradation scheme and degradation schedule selected by the user.

A categorizer 124 may be executed in the computing device 103 to automatically categorize files 130. When a file 130 is automatically categorized, the file category 137 is updated to reflect the newly assigned category. Degradation policies may include conditions dependent upon file categories 137 assigned by a categorizer 124. The categorizer 124 categorizes files stored in the data store 115. A user configures the operation of the categorizer 124 through the use of the user interface 190.

In one embodiment, a categorizer 124 is a face recognition application that employs various facial recognition techniques to identify the subjects of digital photographs. A user can specify the parameters of the face recognition application to achieve desired results. Thus, when a user stores a digital photograph in the data store 115, the categorizer 124 can tag the digital photograph with people identified by the categorizer 124 such as, for example, Nick and Sheila. After a digital photograph has been tagged by the categorizer 124, the file category 137 is updated. Thus, by the use of the categorizer 124, a single digital photograph of Nick and Sheila is associated with at least two categories: pictures of Nick; and pictures of Sheila.

A user may then implement a policy of degrading any picture with Nick and/or Sheila after eight years by converting the picture to a JPG format. In this case, the storage optimizer 118 receives a selection from a user for implementing a degradation scheme of a file format conversion and a degradation schedule implementing the degradation scheme in five years.

In another embodiment, the categorizer 124 can be a text string searcher that identifies the content of documents based on whether the document includes one or more keywords. For example, any document that includes the keywords "IRS" or "income tax" is categorized as a "tax" document by the categorizer 124. Accordingly, any document subsequently stored in the data store 115 that has these keywords will have a file category 137 of "tax" document.

The categorizer 124 may alternatively be configured to categorize files based on the file name 132 or their rate and/or degree of access reflected in the access data 133. Thus any file 130 may have one or more file categories 137 whether the categories are created automatically by a categorizer 124 or whether they are created manually by a user. The user may then indicate to the storage optimizer 118 to implement a degradation policy for files that fall within a particular file category 137.

The categorizer 124 may also be configured to identify the content or subject matter of the file 130 based on text searching techniques, voice or audio recognition techniques, or any image recognition techniques. For example, the categorizer 124 may determine that a particular audio file is a non-music audio file based on the waveform patterns of the audio file. Accordingly, the categorizer 124 can designate this audio file with the file category 137 of a "spoken word" or "non-music" audio file. This assists the user in initiating a degradation policy for slowly degrading the bit rate for any "non-music" audio file over a long period of time. Specifically, the user can select a degradation schedule of reducing the bit rate starting in six years. Furthermore, the bit rate can be reduced to a target bit rate after a specified period of time. So, the transformation can begin on year five and end on year nine, where in each year between year five and year nine, the bit rate of the "non-music" audio files is gradually reduced.

Figure 2A:
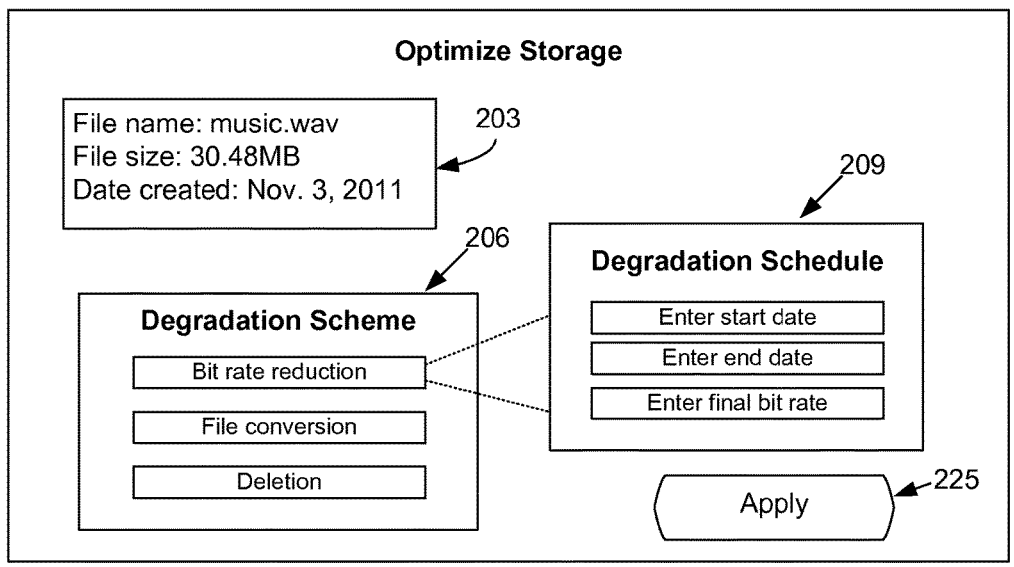
FIG. 2A is a drawing of an example of a user interface rendered by a client in the networked environment of FIG. 1 according to various embodiments of the present disclosure.

Referring next to FIG. 2A, shown is an example of a user interface 190a within a networked environment 100 (FIG. 1). In particular, the storage optimizer 118 (FIG. 1) generates network content to send to a client 106 (FIG. 1) over the network 109 (FIG. 1). The client 106 may execute a browser 198 (FIG. 1) or any other client application 196 (FIG. 1) to render the display of the network content. The rendered network content is presented in one or more user interfaces 190a to facilitate one or more selections of a file degradation scheme and a file degradation schedule for a particular file.

The user interface 190a includes a file identifier 203, a degradation scheme selector 206, and a degradation schedule selector 209. The user interface also includes an apply button 225 to submit the one or more selections to the storage optimizer 118. The file identifier 203 indicates the file subject to degradation. This may include the file name 132 (FIG. 1), file size, date created, and/or any other information relating to the properties of the file. This allows a user to properly identify the file and understand the cost of storing the file in memory in a data store 115 (FIG. 1). Specifically, according to the user interface 190a, the file, "music.wav," consumes 30.48 MB of memory allocated to the user. This may assist the user in deciding whether to degrade the file and to what extent the file should be degraded.

The user interface 190a includes a degradation scheme selector 206 for specifying a manner and procedure for degrading the file titled "music.way." The user interface 109a may include any variety of degradation scheme selectors depending on the file type and format. In this case, "music.wav" is an audio file of a "wave" type format. Accordingly, the user interface 190a presents to the user a degradation scheme selector 206 that corresponds to "wave" audio files. Specifically, when generating the network content for presenting this user interface 190a, the storage optimizer 118 has omitted degradation schemes unique to image files, text document files, and video files. For example, the transformation of black and white conversion is specific to image files. By using the degradation scheme selector 206, the user can select a desired degradation scheme pertaining to the "wave" file.

Through the various ways of interacting with the user interface 109a, such as hovering a mouse pointer over a hotspot, clicking the mouse, using any keyboard keys, etc., a corresponding degradation schedule selector 209 appears. If the user selects a bit rate reduction scheme, then the user may use the degradation schedule selector 209 to select a start date for when the bit rate reduction transformation should begin. The user may also specify an end date as well as a final bit rate. In one example, if "music.wav" is originally at a bit rate of 256 kilobits per second, the user can select a bit rate reduction starting in five years and ending in ten years with a final bit rate targeted for 128 kilobits per second. The user may then click the apply button 225 to send the selections to the storage optimizer 118. Upon receiving these selections, the storage optimizer 118 will implement the selected degradation scheme and selected degradation schedule. In this case, "music.wav" will be stored in the data store 115 as a 30.38 MB file with a bit rate of 256 kilobits per second for five years. Between year five and year ten, the bit rate of "music.wav" will reduce from 256 kilobits per second to 192 kilobits per second to 160 kilobits per second and ending on 128 kilobits per second in year 10. Specifically, a transformation application 121 (FIG. 1) will gradually reduce the bit rate of "music.wav" over time between year five and year ten. After year ten, the size of "music.wav" will have significantly reduced yielding more space in the data store 115 allocated to the user.

Figure 2B:
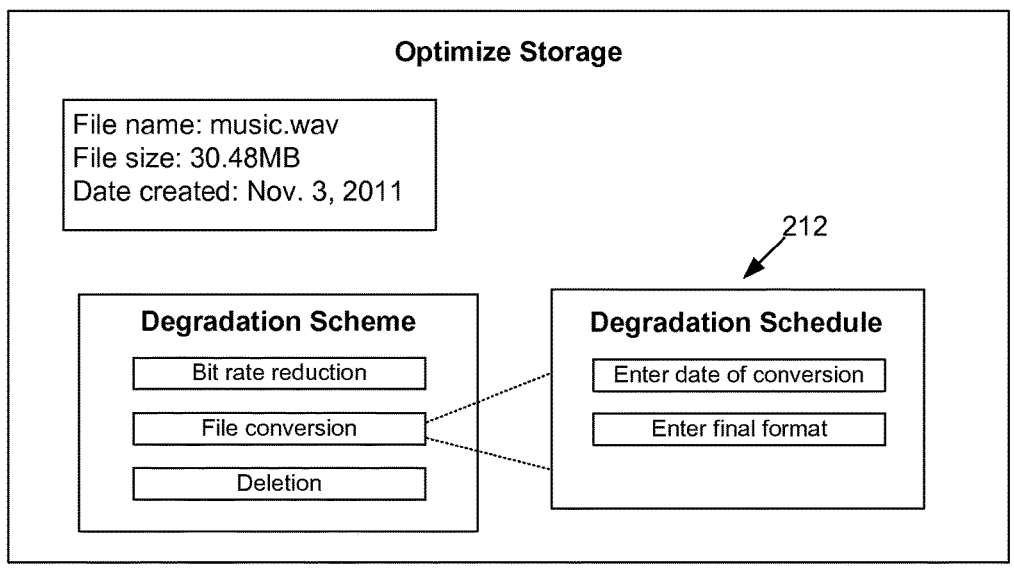
FIG. 2B is a drawing of an example of a user interface that is a variation of the user interface of FIG. 2A according to various embodiments of the present disclosure.

Turning now to FIG. 2B, shown is another example of a user interface 190b in a networked environment 100 (FIG. 1). Specifically, FIG. 2B depicts a user interface 190b if the user in the example of FIG. 2A chose a degradation scheme of a file conversion rather than a bit rate conversion. FIG. 2B includes a degradation schedule selector 212.

In FIG. 2A, the degradation schedule selector 209 is displayed in response to the corresponding degradation scheme of a bit rate reduction. FIG. 2B, on the other hand, includes a degradation schedule selector 212 in response to a corresponding degradation scheme of a file conversion. Thus, each degradation scheme may have a unique user interface for making a degradation schedule selection. A user who selects a degradation scheme of a file conversion may specify a future date of conversion as well as a final format. As an example, using the user interface 190b, the user can choose to convert "music.wav" into an mp3 file in six years.

Figure 3:
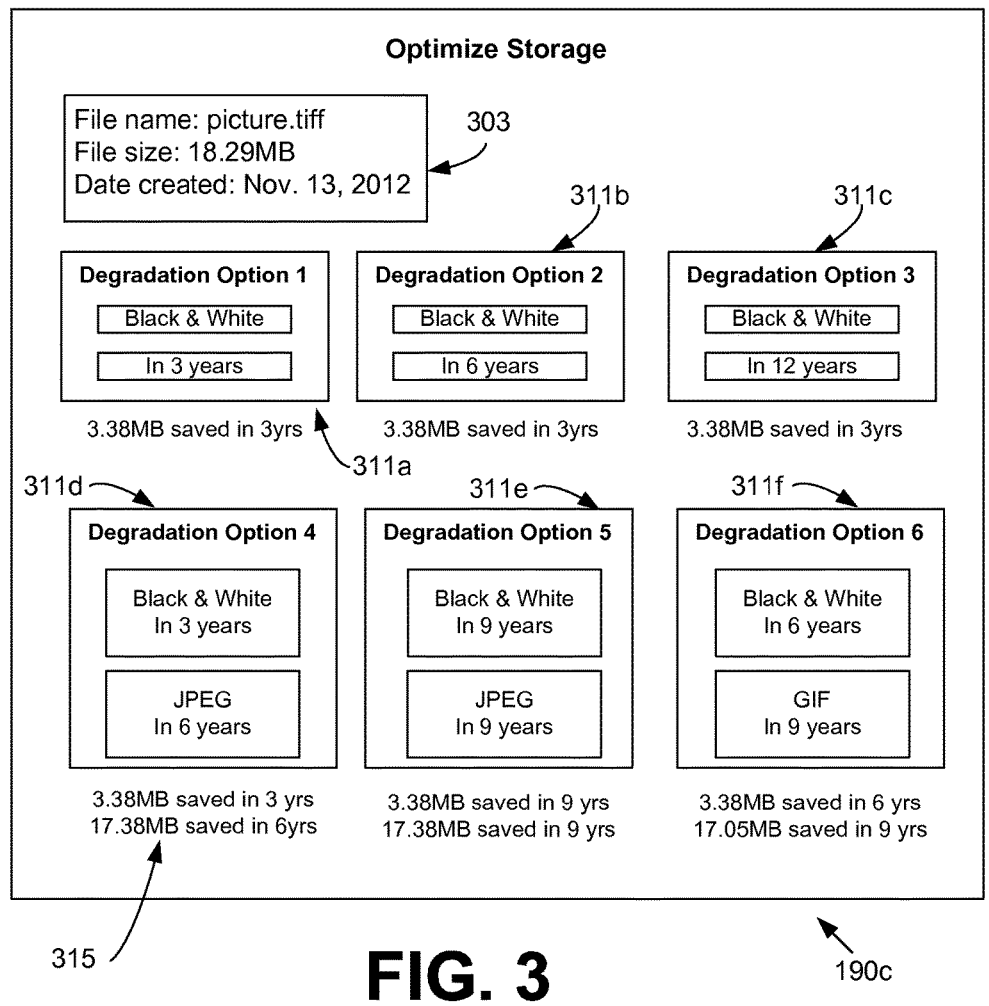
FIG. 3 is a drawing of an example of a user interface rendered by a client in the networked environment of FIG. 1 according to various embodiments of the present disclosure.

Turning now to FIG. 3, shown is an example of a user interface 190c within a networked environment 100 (FIG. 1). In particular, the storage optimizer 118 (FIG. 1) generates network content to send to a client 106 (FIG. 1) over the network 109 (FIG. 1). The client 106 may execute a browser 198 (FIG. 1) or any other client application 196 (FIG. 1) to render the display of the network content. The rendered network content is presented in a user interface 190c to facilitate one or more selections of a file degradation scheme and a file degradation schedule for a particular file.

The user interface 190c includes a file identifier 303. The user interface 190c also includes a variety of degradation options 311a-f. Each degradation option includes a corresponding optimized storage indicator 315.

The file identifier 303 indicates the file subject to degradation. This may include the file name 132 (FIG. 1), file size, date created, and/or any other information relating to the properties of the file. This allows a user to properly identify the file and understand the cost of storing the file in memory in a data store 115 (FIG. 1). Specifically, according to the user interface 190c, the file, "picture.tiff," consumes 18.29 MB of memory allocated to the user. This may assist the user in deciding whether to degrade the file and to what extent the file should be degraded.

Also, the user interface 190c includes a variety of degradation options 311a-f to facilitate a selection for degrading the file "picture.tiff". The storage optimizer 118 may generate one or more degradation options for a user to degrade a file. The storage optimizer may determine the one or more degradation options based on a variety of factors such as historical patterns relating to degradation options chosen in the past by any number of users, the size of the file, the format of the file, the amount of allocated space remaining for the user, the rate in which the user is consuming allocated storage space, etc.

Each degradation option includes a degradation scheme and a degradation schedule. For example, Degradation Option One 311a includes a degradation scheme of converting "picture.tiff" into a black and white image. Degradation Option One 311a also includes a degradation schedule specifying performing the degradation in three years. A user may select any of the presented degradation options 311a-f for degrading the file. The storage optimizer 118 receives the selections and functions accordingly based on the selection. Thus, by making one selection, the user can designate a degradation schedule and a degradation scheme for "picture.tiff."

Each degradation option 311a-f includes a corresponding optimized storage indicator 315 for presenting a potential savings in memory resources. For example, in Degradation Option One 311a, the optimized storage indicator 315 informs the user that the user will save 3.38 MB of memory in three years if Degradation Option One 311a is selected. That is to say, by performing the black and white conversion, "picture.tiff" will be reduced in size by 3.38 MB. Optimized storage indicators 315 provide information to a user when deciding which degradation scheme to employ in order to effectuate proper decision making.

In one embodiment of the present disclosure, a user may specify a degradation policy that includes a degradation scheme for applying differing types of transformations. For example, in Degradation Option Six 311f, a black and white transformation is applied to "picture.tiff" in six years and then a file format transformation of converting "picture.tiff" to a GIF file type is applied three years after the black and white transformation. Thus, a degradation scheme may combine various transformations that are scheduled at different points in time.

Figure 4:
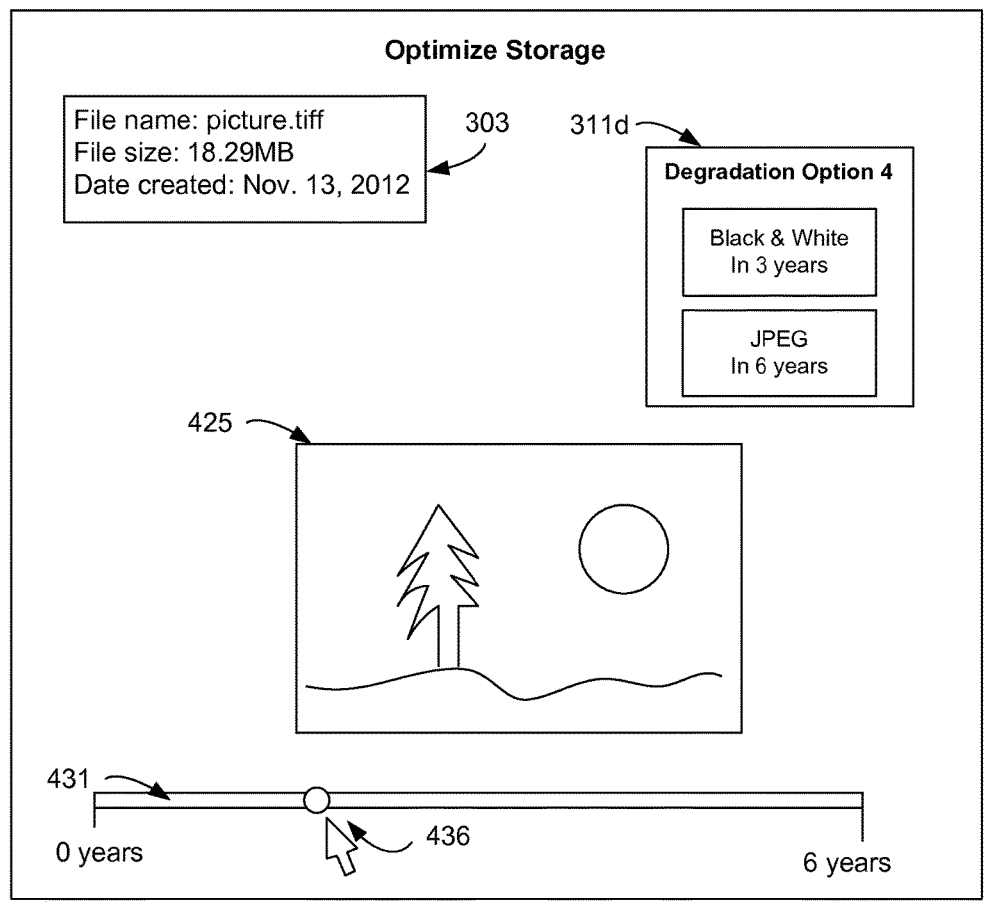
FIG. 4 is a drawing of an example of a user interface rendered by a client in the networked environment of FIG. 1 according to various embodiments of the present disclosure.

Moving on to FIG. 4, shown is an example of a user interface 190d within a networked environment 100 (FIG. 1). Specifically, FIG. 4 depicts various preview features included in a user interface 190d to assist a user in making a selection for degrading a file 130 (FIG. 1). In one embodiment, the user is presented with the user interface 190d after the user decides to investigate a particular degradation option 311a-f (FIG. 3). For example, if a user chooses to investigate Degradation Option Four 311d of FIG. 3, then the user may be presented with the user interface 190d of FIG. 4.

The user interface 190d may include a file identifier 303 as well as the details of a degradation option 311d. Additionally, the user interface includes a preview 425 for display to the user. In one embodiment the preview 425 is controlled by a timeline 431 by way of an interactive slider 436.

The preview 425 presents the file 130 to the user. Depending on the format of the file 130, the preview 425 may be a video player, picture display, audio player, or any other display for presenting file content. The preview 425 shows the file subject to degradation at different points in time if the selections of the user were carried out by the storage optimizer 118 (FIG. 1).

The preview 425 may be manipulated by the user by sliding the interactive slider 436 through the timeline 431. Based on the specifications described by Degradation Option Four 311d, the user will see in the preview 425 that at year three, the preview 425 of "picture.tiff" may transform to black and white. And at year six, the user may see any visual artifacts resulting from a JPG file conversion. Based on the preview 425 in the user interface 190d, the user can decide whether to submit the selection to the storage optimizer 118.

Figure 5:
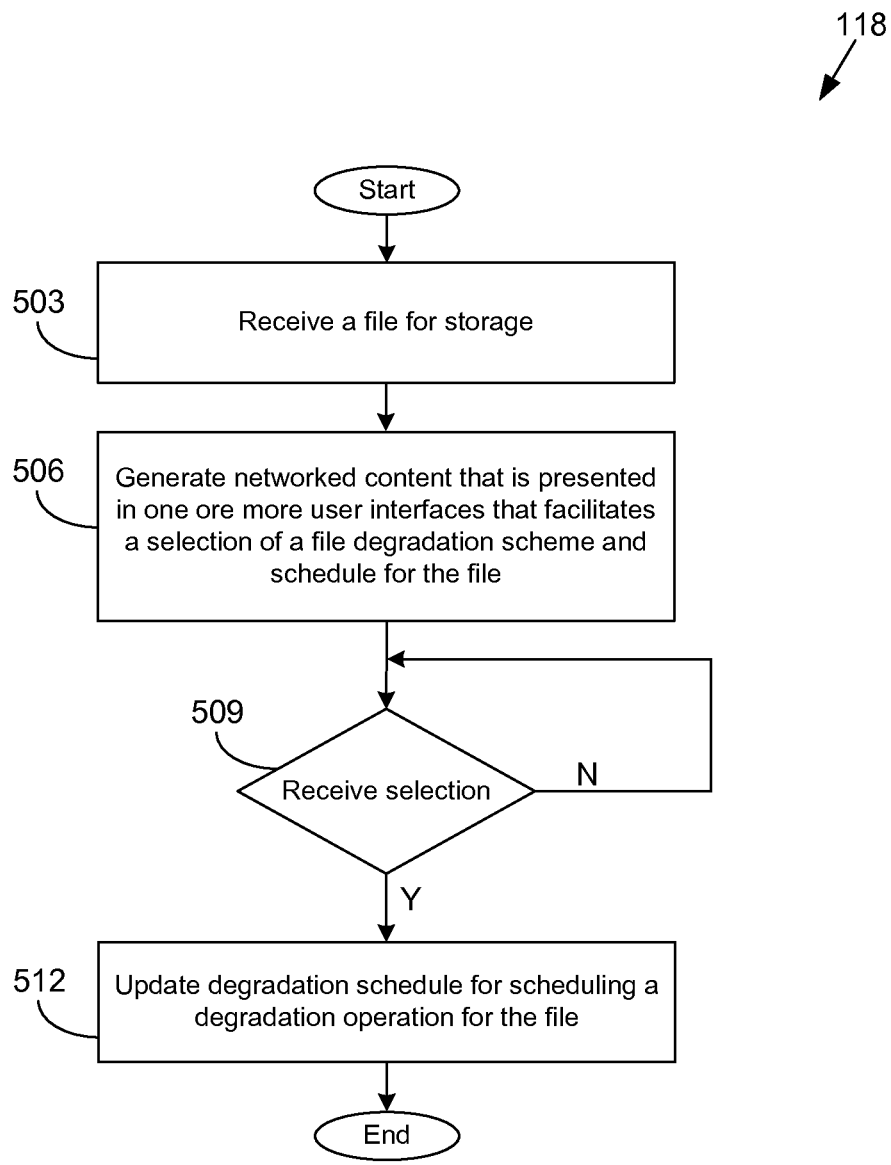
FIG. 5 is a flowchart illustrating one example of functionality implemented as portions of the storage optimizer executed in a computing device in the networked environment of FIG. 1 according to various embodiments of the present disclosure.

Referring next to FIG. 5, shown is a flowchart that provides one example of the operation of a portion of the storage optimizer 118 (FIG. 1) according to various embodiments. It is understood that the flowchart of FIG. 5 provides merely an example of the many different types of functional arrangements that may be employed to implement the operation of the portion of the storage optimizer 118 as described herein. As an alternative, the flowchart of FIG. 5 may be viewed as depicting an example of steps of a method implemented in the computing device 103 (FIG. 1) according to one or more embodiments.

Beginning with box 503, a storage optimizer 118 facilitates receiving a file for storage. In one example, the user uploads one or more files 130 (FIG. 1) over a network 109 (FIG. 1) to a computing device 103 (FIG. 1). The storage optimizer 118 tracks files as they are stored in a data store 115 (FIG. 1) within the computing device 103.

In box 506, the storage optimizer 118 generates network content that is presented in one or more user interfaces 190 (FIG. 1) that facilitates a selection of a degradation scheme and degradation schedule for the file for specifying a degradation policy. In one embodiment, the storage optimizer 118 generates the network content immediately after a file is stored in the data store 115. In alternate embodiments, the storage optimizer 118 generates the network content that is presented in one or more user interfaces 190 in response to a batch of files being stored in the data store 115. For example, if the user stores many photos made up of several files as a single photo album in the data store 115, then the storage optimizer 118 facilities one or more selections to be applied to the photo album as a batch.

In one embodiment, the network content includes one or more optimized storage indicators 315 (FIG. 3) to assist the user in making a selection. An optimized storage indicator 315 provides information to the user regarding potential memory savings based on a degradation option. Additionally, the network content may include a preview 425 (FIG. 4) of a potential degraded file. In this case, the preview 425 is presented to the user in one or more user interfaces 190.

In one embodiment, the selection of the file degradation scheme and schedule is made prior to receiving the file 130 for storage. In this case, the user selects a degradation policy to be implemented in regard to multiple files subsequently stored in storage. Thus, the policy functions as a rule for processing subsequently stored files as opposed to independently specifying a file degradation scheme for each file.

In box 509, the storage optimizer 118 waits for the user to make one or more selections. In box 512, once a selection is made, the storage optimizer 118 updates a degradation schedule 139 (FIG. 1) for scheduling a degradation operation for the file or files. For example, the storage optimizer 118 receives a specification for a degradation policy, where the degradation policy includes a degradation scheme and a degradation schedule. In one embodiment, the degradation policy also includes a condition specifying when to implement the degradation policy.

Figure 6:
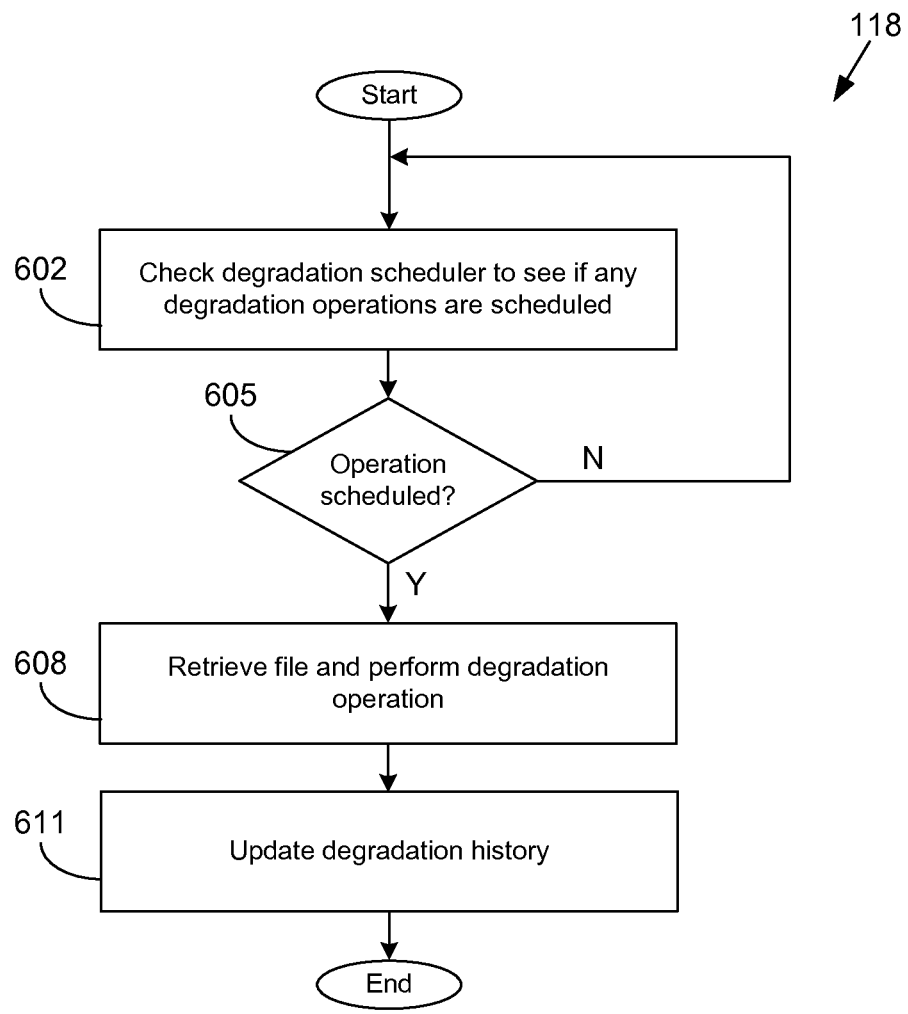
FIG. 6 is a flowchart illustrating one example of functionality implemented as portions of the storage optimizer executed in a computing device in the networked environment of FIG. 1 according to various embodiments of the present disclosure.

Referring next to FIG. 6, shown is a flowchart that provides one example of the operation of a portion of the storage optimizer 118 (FIG. 1) according to various embodiments. It is understood that the flowchart of FIG. 6 provides merely an example of the many different types of functional arrangements that may be employed to implement the operation of the portion of the storage optimizer 118 as described herein. As an alternative, the flowchart of FIG. 6 may be viewed as depicting an example of steps of a method implemented in the computing device 103 (FIG. 1) according to one or more embodiments.

In box 602, the storage optimizer 118 checks a degradation schedule 139 (FIG. 1) to see if any degradation operations are scheduled. In one embodiment, the degradation schedule 139 is a master list indicating which files 130 (FIG. 1) stored on a data store 115 (FIG. 1) by many users that are subject to degradation. The degradation schedule 139 may also include the details of the degradation scheme scheduled to be performed on each file 130 included in the degradation schedule 139. Alternatively, each file 130 may include any scheduled degradation in the degradation schedule 139 as metadata.

In box 605, the storage optimizer 118 determines whether any degradation operations are scheduled. If no operations are scheduled, then the storage optimizer 118 continues checking the degradation schedule 139. If a degradation operation is scheduled, then in box 608, the storage optimizer retrieves the proper file or files 130 and then performs the degradation operation. In one embodiment, the storage optimizer instructs a transformation application 121 (FIG. 1) to perform a transformation on the one or more retrieved files 130 to degrade the file 130 and lower the size of the file or files 130. In another embodiment, the storage optimizer 118 removes the file 130 from the data store 115 and sends the file 130 to an auxiliary storage 160 (FIG. 1).

In box 611, the storage optimizer 118 updates the degradation history 135 (FIG. 1) of the one or more files that were subject to the degradation operation. This allows the user and the storage optimizer 118 to track the history of the file 130 to determine whether the file 130 is an original or a degraded version of the original.

Figure 7:
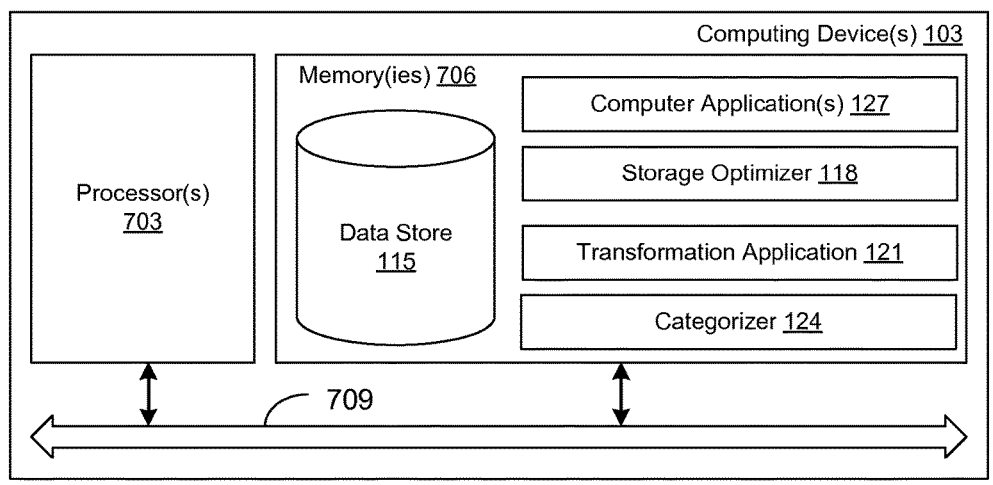
FIG. 7 is a schematic block diagram that provides one example illustration of a computing device employed in the networked environment of FIG. 1 according to various embodiments of the present disclosure.

With reference to FIG. 7, shown is a schematic block diagram of the computing device 103 according to an embodiment of the present disclosure. The computing device 103 includes at least one processor circuit, for example, having a processor 703 and a memory 706, both of which are coupled to a local interface 709. To this end, the computing device 103 may comprise, for example, at least one server computer or like device. The local interface 709 may comprise, for example, a data bus with an accompanying address/control bus or other bus structure as can be appreciated.

Stored in the memory 706 are both data and several components that are executable by the processor 703. In particular, stored in the memory 706 and executable by the processor 703 are computer applications 127, a storage optimizer 118, a transformation application 121, a categorizer 124, and potentially other applications. Also stored in the memory 706 may be a data store 115 and other data. In addition, an operating system may be stored in the memory 706 and executable by the processor 703.

It is understood that there may be other applications that are stored in the memory 706 and are executable by the processors 703 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 706 and are executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703 may represent multiple processors 703 and the memory 706 may represent multiple memories 706 that operate in parallel processing circuits, respectively. In such a case, the local interface 709 may be an appropriate network 109 (FIG. 1) that facilitates communication between any two of the multiple processors 703, between any processor 703 and any of the memories 706, or between any two of the memories 706, etc. The local interface 709 may comprise additional systems designed to coordinate this communication, including, for example, performing load balancing. The processor 703 may be of electrical or of some other available construction.

Although computer applications 127, the storage optimizer 118, the transformation application 121, the categorizer 124, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 5 and 6 show the functionality and operation of an implementation of portions of the storage optimizer 118. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 703 in a computer system or other system. The machine code may be converted from the source code, etc. If embodied in hardware, each block may represent a circuit or a number of interconnected circuits to implement the specified logical function(s).

Although the flowcharts of FIGS. 5 and 6 show a specific order of execution, it is understood that the order of execution may differ from that which is depicted. For example, the order of execution of two or more blocks may be scrambled relative to the order shown. Also, two or more blocks shown in succession in FIGS. 5 and 6 may be executed concurrently or with partial concurrence. Further, in some embodiments, one or more of the blocks shown in FIGS. 5 and 6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including computer applications 127, the storage optimizer 118, the transformation application 121, the categorizer 124, that comprises software or code can be embodied in any non-transitory computer-readable medium for use by or in connection with an instruction execution system such as, for example, a processor 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program that, when executed by at least one of one or more computing devices, directs at least one of the one or more computing devices to perform a method comprising:
   receiving, by at least one of the one or more computing devices, a file for storage in a memory;
   determining, by at least one of the one or more computing devices, a type of the file;
   determining, by at least one of the one or more computing devices, a category of the file based at least in part on content identified in the file using at least in part a facial recognition technique;
   generating, by at least one of the one or more computing devices, network content to be rendered in at least one user interface for display;
   receiving, by at least one of the one or more computing devices, a first selection through the user interface specifying a degradation scheme including a plurality of degradation operations for the file, wherein individual ones of the degradation operations degrade a quality of a portion of the content in the file based at least in part on the facial recognition technique, the category of the file, and the content identified in the file;
   receiving, by at least one of the one or more computing devices, a second selection specifying a degradation schedule, the degradation schedule specifying when individual ones of the degradation operations are to occur;
   generating, by at least one of the one or more computing devices, a degradation policy that progressively degrades the quality of the content in the file to reduce a size of the file based at least in part on the degradation scheme, the category of the file, and the content identified in the file over a period of time according to the degradation schedule;
   providing, by at least one of the one or more computing devices, an indicator in the at least one user interface that represents a potential savings amount of a memory resource according to the degradation policy;
   providing, by at least one of the one or more computing devices, a representation in the at least one user interface of a degraded version of the file according to the degradation policy; and
   implementing, by at least one of the one or more computing devices, the degradation policy with respect to the file.

2. The computer-readable medium of claim 1, wherein the category of the file comprises at least one of an image file, a document file, an audio file, or a video file category.

3. A system, comprising:
one or more computing devices configured to:
receive, by at least one of the one or more computing devices, a file for storage in a memory;
determine, by at least one of the one or more computing devices, a type of the file;
determine, by at least one of the one or more computing devices, a category of the file based at least in part on content identified in the file using at least in part a facial recognition technique;
generate, by at least one of the one or more computing devices, network content to be rendered in at least one user interface;
receive, by at least one of the one or more computing devices, a selection of a file storage policy through the user interface, the file storage policy comprising a file storage scheme for reducing a size of the file over time, the file storage policy further comprising a file storage schedule that specifies when a plurality of degradation operations are to occur, wherein individual ones of the plurality of degradation operations degrade a quality of a portion of the content in the file based at least in part on the facial recognition technique, the category of the file, and the content identified in the file;
generate, by at least one of the one or more computing devices, a degradation policy that progressively degrades the quality of the file over a period of time according to a file storage schedule and the plurality of degradation operations to reduce a size of the file based at least in part on the facial recognition technique, the category of the file, and the content identified in the file;
provide, by at least one of the one or more computing devices, an indicator in the at least one user interface that represents a potential savings amount of a memory resource according to the file storage policy; and
implement, by at least one of the one or more computing devices, the degradation policy to degrade the quality of the content in the file and reduce the size of the file by executing at least one of the plurality of degradation operations.

4. The system of claim 3, wherein the type of the file comprises at least one of an image file, a document file, an audio file, or a video file type.

5. The system of claim 3, wherein at least one of the one or more computing devices is further configured to generate a representation in the at least one user interface of a degraded version of the file according to the file storage policy.

6. The system of claim 5, wherein the at least one user interface includes an interactive slider to facilitate viewing the file in a plurality of degraded states at a plurality of points in time.

7. The system of claim 3, wherein at least one of the plurality of degradation operations comprises at least one of a bit rate reduction, a color saturation change, or a selective deletion of a portion of the file.

8. The system of claim 3, wherein the file storage schedule is determined by allowing a user to select, using the at least one user interface, one of a plurality of predefined schedules.

9. The system of claim 3, wherein at least one of the one or more computing devices is further configured to transfer the file to an auxiliary storage in accordance with the file storage schedule.

10. The system of claim 3, wherein the plurality of degradation operations reduce a resolution of the portion of the content in the file over time.

11. The system of claim 3, wherein individual ones of the plurality of degradation operations delete respective portions of the content in the file over time.

12. The system of claim 3, wherein the one or more computing devices are further configured to initiate a first one of the plurality of degradation operations based at least in part on a triggering event.

13. A method, comprising:
determining, by at least one of one or more computing devices, a type of a file stored in a memory;
determining, by at least one of the one or more computing devices, a category of the file based at least in part on content identified in the file using at least in part a facial recognition technique;
obtaining, by at least one of the one or more computing devices, a file storage policy, the file storage policy comprising a plurality of degradation operations, wherein individual ones of the plurality of degradation operations degrade a quality of a portion of the content in the file based at least in part on the facial recognition technique, the category of the file, and the content identified in the file;
generating, by at least one of the one or more computing devices, a degradation policy that progressively degrades the quality of the file over a period of time according to a file storage schedule and the plurality of degradation operations reduce a size of the file based at least in part on the facial recognition technique, the category of the file, and the content identified in the file;
implementing, by at least one of the one or more computing devices, the degradation policy to degrade the quality of the content in the file and reduce the size of the file by executing at least one of the plurality of degradation operations; and
updating, by at least one of the one or more computing devices, a degradation history of the file in response to implementing the degradation policy.

14. The method of claim 13, further comprising implementing, by at least one of the one or more computing devices, the file storage policy based at least further in part on the category for the file.

15. The method of claim 14, wherein determining the category for the file further comprises employing, by at least one of the one or more computing devices, the facial recognition technique.

16. The method of claim 14, wherein determining the category for the file further comprises searching, by at least one of the one or more computing devices, the file for at least one keyword.

17. The method of claim 14, wherein the category for the file is based at least in part on a frequency of access of the file.

18. The method of claim 13, wherein at least one of the plurality of degradation operations comprises at least one of a bit rate reduction, a color saturation change, a selective deletion of a portion of the file, or an encryption.

19. The method of claim 13, further comprising initiating, by at least one of the one or more computing devices, a first one of the plurality of degradation operations in response to a triggering event.

20. The method of claim 13, wherein the file storage policy excludes another portion of the file from degradation.

* * * * *